(12) United States Patent
Hofig et al.

(10) Patent No.: US 8,788,161 B2
(45) Date of Patent: Jul. 22, 2014

(54) METHOD FOR SETTING THE WORKING PRESSURE OF A TRANSMISSION

(75) Inventors: Bernhard Hofig, Heidenheim (DE); Michael Gerlich, Konigsbronn (DE); Michael Reik, Saarbrucken (DE); Christoph Wurster, Lonsee (DE)

(73) Assignee: Voith Patent GmbH, Heidenheim (DE)

( * ) Notice: Subject to any disclaimer, the term of this patent is extended or adjusted under 35 U.S.C. 154(b) by 20 days.

(21) Appl. No.: 13/580,769

(22) PCT Filed: Nov. 15, 2011

(86) PCT No.: PCT/EP2011/005736
§ 371 (c)(1),
(2), (4) Date: Oct. 26, 2012

(87) PCT Pub. No.: WO2012/069152
PCT Pub. Date: May 31, 2012

(65) Prior Publication Data
US 2013/0211680 A1 Aug. 15, 2013

(30) Foreign Application Priority Data
Nov. 25, 2010 (DE) .......................... 10 2010 052 337

(51) Int. Cl.
*G06F 7/00* (2006.01)
*F16H 59/46* (2006.01)

(52) U.S. Cl.
CPC ..................................... *F16H 59/46* (2013.01)
USPC .................. 701/53; 701/51; 701/61; 701/67; 701/79

(58) Field of Classification Search
USPC ................. 701/51, 53, 61, 67, 70, 71, 74, 79; 74/473.18; 477/121
See application file for complete search history.

(56) References Cited

U.S. PATENT DOCUMENTS

| | | | |
|---|---|---|---|
| 4,274,306 A * | 6/1981 | Yokoi et al. | .................... 477/121 |
| 4,785,689 A | 11/1988 | Iwatsuki | |
| 4,805,750 A | 2/1989 | Nitz | |

(Continued)

FOREIGN PATENT DOCUMENTS

| | | |
|---|---|---|
| DE | 36 30 792 | 10/1994 |
| DE | 35 42 956 | 7/1995 |
| DE | 43 33 899 | 7/1995 |
| DE | 37 29 463 | 6/1996 |
| DE | 196 33 420 | 3/1997 |
| DE | 36 30 768 | 4/1997 |

(Continued)

OTHER PUBLICATIONS

International Preliminary Report on Patentability dated May 28, 2013 for International application No. PCT/EP2011/005736.

*Primary Examiner* — Gertrude Arthur Jeanglaude
(74) *Attorney, Agent, or Firm* — Farjami & Farjami LLP

(57) ABSTRACT

There is provided a method for setting an operating pressure of a transmission, the transmission having at least one of clutches, brakes, actuators, a hydrodynamic clutch, and a hydrodynamic converter, to which a medium conducting the operating pressure can selectively be applied, in order to vary a transmission ratio of at least one of a speed and a torque between a transmission input shaft and a transmission output shaft by opening and closing at least one of the clutches and the brakes, by actuating the actuators, and/or by a hydrodynamic power transmission using at least one of the hydrodynamic clutch and the hydrodynamic converter, wherein the operating pressure being switchable between a constant nominal value and a constant decreased value that is smaller in relation thereto, or the operating pressure being reducible in three or more steps or continuously from a nominal value to a decreased value.

20 Claims, 1 Drawing Sheet

(56) References Cited

U.S. PATENT DOCUMENTS

| | | | |
|---|---|---|---|
| 4,958,538 A | 9/1990 | Yamashita | |
| 5,400,675 A | 3/1995 | Nagano | |
| 5,400,678 A | 3/1995 | Jain | |
| 5,458,545 A | 10/1995 | Adam | |
| 5,647,312 A * | 7/1997 | Salber et al. | 123/90.16 |
| 5,791,197 A * | 8/1998 | Rempinski et al. | 74/473.18 |
| 5,911,244 A | 6/1999 | Long | |
| 5,954,179 A * | 9/1999 | Osborn | 192/219.5 |
| 2005/0221948 A1 | 10/2005 | Iwamoto | |

FOREIGN PATENT DOCUMENTS

| | | |
|---|---|---|
| DE | 694 20 107 | 12/1999 |
| DE | 103 58 005 | 1/2005 |
| DE | 699 28 730 | 8/2006 |
| DE | 10 2005 059 356 | 6/2007 |
| DE | 196 34 761 | 3/2010 |
| EP | 1 507 101 | 2/2005 |
| GB | 1 261 956 | 2/1972 |
| WO | WO 95/09741 | 4/1995 |

* cited by examiner

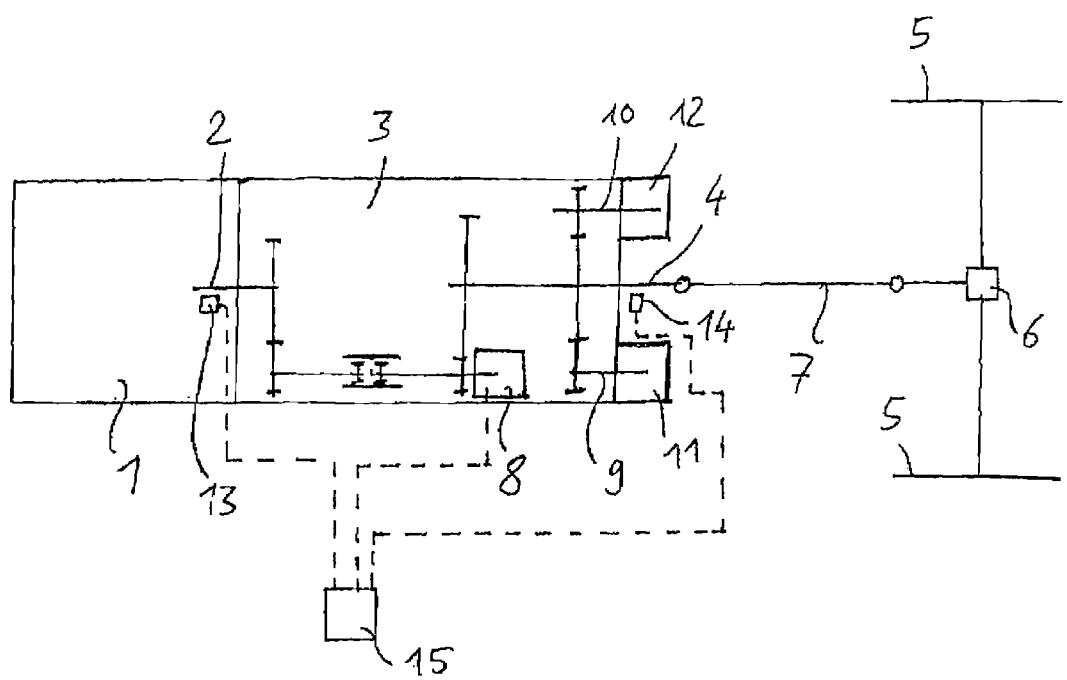

METHOD FOR SETTING THE WORKING PRESSURE OF A TRANSMISSION

This is a U.S. national phase application, which is based on, and claims priority from, PCT application Serial No. PCT/EP2011/005736, filed Nov. 15, 2011, which claims priority from foreign application Serial No. 10 2010 052 337.2, filed Nov. 25, 2010, in Germany.

FIELD OF THE INVENTION

The invention relates to a transmission, for example, a continuous transmission or shift transmission, in particular a motor vehicle shift transmission, and a method for setting the operating pressure in the transmission.

BACKGROUND

Shift transmissions, in which a medium conducting an operating pressure can alternately be applied to clutches, brakes, a hydrodynamic clutch, and/or a hydrodynamic converter, to vary the transmission ratio of the speed and/or the torque between a transmission input shaft and a transmission output shaft by opening and closing the clutches and/or brakes and/or by hydrodynamic power transfer using the hydrodynamic clutch and/or the hydrodynamic converter, and control devices for setting the operating pressure are described, for example, in the following documents:

DE 35 42 956 C2
DE 36 30 792 C2
DE 43 33 899 A1
DE 699 28 730 T2
DE 103 58 005 B3
DE 196 34 761 B4
DE 37 29 463 C2
DE 36 30 768 C2.

The methods according to which these control devices operate provide a continuous variation of the operating pressure as a function of different variables, for example, the engaged gear, the power of a drive engine, which drives the transmission, as a function of a shift action or on the basis of the differentiation between the traction operation and the overrun operation of the drive engine. For example, the control pressure which acts on the operating pressure is set proportionally to the engine load.

Through the known methods for continuous variation of the operating pressure, unnecessary power consumption of the pump, typically an oil pump, which delivers the medium conducting the operating pressure, in particular oil, to bring it to the desired pressure, can be avoided, in that only as much operating pressure is generated as is considered to be sufficient on the basis of the mentioned dependencies. However, the comparatively large outlay is problematic with such a continuous setting of the operating pressure. For example, pumps which can be regulated or controlled must typically be provided.

A further disadvantage of the known method is that, on the one hand, because of manufacturing tolerances and, on the other hand, because of wear over the operating time, the actually resulting operating pressure can deviate from the selected theoretical specifications and dependencies. This can have the result, in particular with increasing age of the transmission or the oil used in the transmission, that an undesired reduction of the operating pressure occurs, which can result in control errors in the transmission and increased wear of the components participating in shift actions, in particular the clutches and brakes.

SUMMARY

The present invention is based on the object of specifying a method for setting the operating pressure of a transmission, for example, in the form of a shift transmission or continuous transmission, in particular for a motor vehicle, which is improved with respect to the mentioned problems. The method is advantageously to be distinguished by cost-effective integration capability in existing or new transmissions with little additional device outlay.

The object according to the invention is achieved by a method having the features of claim 1. Advantageous and particularly expedient embodiments of the invention are specified in the dependent claims.

DETAILED DESCRIPTION

The method according to the invention for setting the operating pressure of a transmission, for example, a continuous transmission or shift transmission, in particular a motor vehicle shift transmission, the transmission having clutches, brakes, actuators, a hydrodynamic clutch, and/or a hydrodynamic converter, to which a medium conducting the operating pressure can selectively be applied, in order to vary the transmission ratio of the speed and/or the torque between a transmission input shaft and a transmission output shaft by opening and closing the clutches and/or brakes, by actuating the actuators, and/or by hydrodynamic power transmission using the hydrodynamic clutch and/or the hydrodynamic converter, provides, according to a first embodiment, switching the operating pressure between a constant nominal value and a constant value which is less than the nominal value, i.e., a decreased value. According to an alternative embodiment, the operating pressure is reduced in three or more steps or continuously from a nominal value to a decreased value.

In both cases, an impermissible decrease of the operating pressure, with the goal of saving drive power or fuel, respectively, the operating pressure decreasing further than intended due to influences such as wear or manufacturing tolerances, is to be prevented in that a speed difference between the transmission input shaft and the transmission output shaft and/or between the input side and output side of at least one clutch, brake, the hydrodynamic clutch, and/or the hydrodynamic converter is detected and compared to a predefined target difference. The switching or reducing of the operating pressure is performed according to the invention as a function of the result of this comparison.

Advantageously, firstly the operating pressure is decreased and subsequently the speed difference is detected and compared to a predefined target difference. As a function of this comparison, in particular if the speed difference is greater than the target difference, the decrease of the operating pressure is partially or completely reversed or the operating pressure is increased by a predefined amount, respectively.

According to an advantageous embodiment, the decrease of the operating pressure is fundamentally performed as a function of an input variable, which describes the permissibility of the switching or decrease, respectively, for example, as a function of the drive power applied to the transmission input shaft or the torque applied thereto, respectively, or as a function of the current engine power of a drive engine, in particular an internal combustion engine, which drives the transmission input shaft. The consideration according to the invention of the speed difference between the transmission input shaft and the transmission output shaft or the above-mentioned components, respectively, is thus performed in addition to the dependence of the switching or reduction, respectively, on the mentioned input variable. The consideration of the speed difference therefore represents a superimposed safety query, which prevents changes in the dependence of the operating pressure on the mentioned input variable from resulting in an undesired slip in the transmission or the components provided therein, respectively.

As the variable (input variable), which describes the permissibility of the switching of the operating pressure to the decreased value or reducing of the operating pressure to the decreased value, additionally or alternatively to the mentioned torque applied to the transmission input shaft or the power applied to the transmission input shaft, respectively, one or more other variables also come into consideration, for example, the torque applied to the transmission output shaft, the power applied to the transmission output shaft, the speed of the transmission output shaft and/or the speed of the transmission input shaft, the engine drag torque, and the power applied to a secondary drive or a secondary output of the transmission or the torque applied thereto, respectively. For example, if a second drive machine, in particular an electric motor or steam engine, is connected to a secondary drive of the transmission, in particular to provide a hybrid drivetrain, with the main drive machine connected to the transmission input shaft, the power output of the engine connected to the secondary drive can result in a comparatively higher torque in the shift transmission or the clutches or brakes provided therein, respectively, which prohibits a decrease or reduction of the operating pressure. This is correspondingly true, for example, for a brake connected to a secondary output of the transmission, for example, a hydrodynamic retarder.

A limiting value can advantageously be specified for the permissibility of the switching to the decreased value or reduction of the variable describing the operating pressure, and the switching or reduction is only performed upon detection of a variable, describing the permissibility of the switching or reduction, which is below the limiting value. Depending on the embodiment, such a limiting value specification can also be performed so that switching or reduction of the operating pressure is only performed in the case of detected variables, describing the permissibility, which are above the limiting value. In order to execute the superimposed consideration of the slip between the transmission input shaft and the transmission output shaft or one or more individual components in transmissions, respectively, the limiting value can be varied as a function of the result of the comparison of the speed difference to the specified target difference.

The limiting value is particularly advantageously reduced in the event of a speed difference above the target difference.

For example, the limiting value can be calculated from the product of a target variable and an adaptation factor, and the adaptation factor can be decreased in the event of a speed difference above the target difference. Of course, the limiting value can alternatively also be calculated from a sum of a target variable and an adaptation summand, the adaptation summand being decreased in the event of a speed difference above the target difference.

In order to reliably prevent the occurrence of an undesired slip in the transmission, according to one embodiment of the invention, a variation of the limiting value is exclusively performed by decrease thereof. This means that once a slip has been detected, the conditions for switching the operating pressure to the decreased value or for reducing the operating pressure in three or more steps or continuously are permanently tightened as soon as a slip has been detected once.

According to an alternative embodiment, this tightening can be canceled after passage of a predetermined time span or after passage of a further predetermined operating duration of the shift transmission, i.e., the limiting value can be increased again. This increase can be performed constantly step-by-step until a slip is detected again, the last step then being reversed. Alternatively, an increase is performed immediately to the limiting value, which would have resulted in the slip detection before passage of the predetermined time span or operating duration, respectively. According to a further embodiment, the increase is performed by setting the limiting value to its starting value, in other words to the standard value, in particular in that the adaptation factor is set to its starting value, in particular to one.

Additionally or alternatively, it is possible that the decreased limiting value is performed manually, in particular in the scope of a service of the transmission or the vehicle having the transmission, respectively, in particular by reset to the starting value. For example, an increase or reset can always be performed whenever the transmission oil has been changed.

According to one embodiment, the oil temperature or the temperature of the medium conducting the operating pressure in general, respectively, is detected, and a switching of the operating pressure to the decreased value or a reduction of the operating pressure in three or more steps or continuously, respectively, is only carried out when the detected temperature is within a predefined temperature interval.

Furthermore, the fact that the pump delivering the medium conducting the operating pressure generates a brake power and it is possible to differentiate in the transmission or in the vehicle, respectively, between traction operation and braking operation, can advantageously be utilized. In braking operation, when a particularly high braking torque of the pump, in particular the oil pump, is desired, switching of the operating pressure to the decreased value or reduction of the operating pressure, respectively, is suspended, even if the other mentioned conditions exist.

If the pump does not always have a drive connection to the output or the transmission output shaft of the transmission, respectively, it can be necessary for this purpose to couple the pump to the transmission output shaft solely for the braking procedure.

A further variable that describes the permissibility of switching to the decreased value or reducing the operating pressure, which can be used as the input variable, is the gear position or the transmission ratio in the shift transmission, respectively. Additionally or alternatively, the shift position of a so-called converter input controller also comes into consideration. Whenever the inflow to the hydrodynamic converter is blocked, the system pressure rises, so that a pressure decrease of the operating pressure can occur at lower limiting values of the at least one other mentioned input variable. The control of other consumers which are shut down, the system pressure rising because of the omission of the consumer, can also be taken into consideration.

The switching of the operating pressure between a constant value and a constant decreased value which is smaller in relation thereto can be performed in consideration of a hysteresis, i.e., the switch back from the smaller decreased value to the constant nominal value is performed at a comparatively greater limiting value of the input variable than the switching down.

In particular in the first alternative of the invention, in which the operating pressure is switched between a constant nominal value and a constant decreased value which is smaller in relation thereto, in addition to the slip monitoring, the permissibility check of decreasing the operating pressure can be performed by continuous calculation of the required minimum operating pressure. For this purpose, from the transmission input torque, i.e., the torque applied to the transmission input shaft, the torque transmittable to the individual shift elements can be calculated, for example, on the basis of a transmission ratio factor, which describes the transmission ratio between the transmission input shaft and the respective shift element, and in particular in consideration of further variables which describe the required operating pressure, for example, the centrifugal force acting in the shift element, a safety supplement, and the force of a spring element which counteracts the operating pressure as the shifting pressure.

Furthermore, it can be checked in the event of a concrete shift to be carried out whether the operating pressure is decreased at the beginning of the shift and whether this decrease of the operating pressure is also possible in the target gear. If this is not the case or if the operating pressure is not decreased at the beginning of the shift, the shift is carried out with non-decreased operating pressure.

Moreover, in the event of failure of a required signal on a variable which describes the permissibility of the switching of the operating pressure to the decreased value or the reduction of the operating pressure, the switching to the decreased value or the reduction can be suspended.

The invention will be explained as an example hereafter on the basis of the figure.

FIG. 1 schematically shows an internal combustion engine 1, which drives the transmission input shaft 2 of a shift transmission 3 of a motor vehicle. The transmission input shaft 2 can have a drive connection via various mechanical and/or hydrodynamic transmission ratios (not shown in greater detail here), i.e., with shifting of various gear steps, to the transmission output shaft 4. The transmission output shaft 4 drives drive wheels 5 of the motor vehicle, for example, with the differential gear 6 and the prop shaft 7 shown here interposed.

An oil pump 8 is provided in the transmission or on the transmission, which delivers oil from a transmission oil sump (not shown in greater detail here), to bring it to the required operating pressure as the medium which conducts the operating pressure. For this purpose, the oil pump 8 will typically deliver against a corresponding accumulation unit, in general a so-called operating pressure valve (not shown).

The oil pump 8 is alternately connectable, for example, via the sliding sleeve shown here, to the transmission input shaft 2 or the transmission output shaft 4. For example, a connection to the transmission output shaft 4 is always produced when the internal combustion engine 1 or the shift transmission 3, respectively, is in overrun operation or braking operation, i.e., the drive power is introduced from the drive wheels 5 via the transmission output shaft 4 into the shift transmission 3. In contrast, in so-called traction operation, i.e., the drive power is transmitted from the transmission input shaft 2 to the transmission output shaft 4, the oil pump 8 can be connected to the transmission input shaft 2.

In the exemplary embodiment shown, the shift transmission 3 has a secondary output 9 and a secondary drive 10. For example, a hydrodynamic brake (retarder) 11 is connected to the secondary output 9. A second drive machine, for example, an electric motor 12 or a steam engine, is connected to the secondary drive 10.

Of course, the embodiment shown here is to be understood solely as an example and modifications thereto can be performed.

A first speed sensor 13 is provided on the transmission input shaft 2 and a second speed sensor 14 is provided on the transmission output shaft 4. The speed sensors 13, 14 detect the speed of the shaft 2, 4 assigned thereto and relay it to a control device 15. The control device 15, which is configured to execute a method according to the invention, controls the setting of the operating pressure via the oil pump 8.

Of course, further sensors can be provided, for example, a speed sensor on the transmission input shaft 2 and/or the transmission output shaft 4, in order to control the setting of the operating pressure as a function of the detected variables, for example, the torque on the transmission input shaft 2 and/or the transmission output shaft 4.

The invention claimed is:

1. A method for setting an operating pressure of a transmission, the transmission having at least one of clutches, brakes, actuators, a hydrodynamic clutch, and a hydrodynamic converter, to which a medium conducting the operating pressure can selectively be applied, in order to vary a transmission ratio of at least one of a speed and a torque between a transmission input shaft and a transmission output shaft by opening and closing at least one of the clutches and the brakes, by actuating the actuators, and/or by a hydrodynamic power transmission using at least one of the hydrodynamic clutch and the hydrodynamic converter, wherein the operating pressure being switchable between a constant nominal value and a constant decreased value that is smaller in relation thereto, or the operating pressure being reducible in three or more steps or continuously from a nominal value to a decreased value, the method comprising:
   detecting a speed difference between the transmission input shaft and the transmission output shaft and/or between an input side and an output side of at least one of the clutches, the brake, the hydrodynamic clutch, and the hydrodynamic converter;
   comparing the speed difference to a predefined target difference;
   switching or reducing the operating pressure, the switching or the reducing being performed as a function of the comparing;
   wherein one or more variables describe a permissibility of the switching or the reducing and include:
     a torque applied to the transmission input shaft;
     a torque applied to the transmission output shaft;
     a power applied to the transmission input shaft;
     a power applied to the transmission output shaft;
     a speed of the transmission input shaft and/or the transmission output shaft;
     a power supplied at a secondary drive of the transmission and/or a torque of a drive machine supplied there;
     a torque applied to a secondary output of the transmission and/or a power applied there;
   the method further comprising:
     detecting an engine drag torque; and
     specifying a limiting value for the engine drag torque describing the permissibility of the switching or the reducing, wherein the switching or the reducing is only performed upon detection of a variable describing the permissibility of the switching or the reducing below the limiting value, the limiting value being varied as a function of the comparing of the speed difference to the predefined target difference.

2. The method according to claim 1, wherein the limiting value is decreased when the speed difference is above the predefined target difference.

3. The method according to claim 2, wherein the limiting value is calculated from a product of a target variable and an adaptation factor or from a sum of the target variable and an adaptation summand, and the adaptation factor or the adaptation summand is decreased when the speed difference is above the predefined target difference.

4. The method according to claim 2, wherein the limiting value is varied exclusively by decrease.

5. The method according to claim 3, wherein the limiting value is varied exclusively by decrease.

6. The method according to claim 2, wherein a decreased limiting value is increased again after passage of a predetermined time span or operating duration of the shift transmission and/or by manual actuation.

7. The method according to claim 3, wherein a decreased limiting value is increased again after passage of a predetermined time span or operating duration of the shift transmission and/or by manual actuation.

8. The method according to claim 3, wherein an increase is performed by setting the adaptation factor or the adaptation summand to a respective starting value.

9. The method according to claim 6, wherein an increase is performed by setting the adaptation factor or the adaptation summand to a respective starting value.

10. The method according to claim 7, wherein an increase is performed by setting the adaptation factor or the adaptation summand to a respective starting value.

11. The method according to claim 1, wherein a temperature of the medium conducting the operating pressure is detected, and switching to the decreased value or the reducing of the operating pressure is only performed within a predefined temperature interval.

12. The method according to claim 2, wherein a temperature of the medium conducting the operating pressure is detected, and switching to the decreased value or the reducing of the operating pressure is only performed within a predefined temperature interval.

13. The method according to claim 3, wherein a temperature of the medium conducting the operating pressure is detected, and switching to the decreased value or the reducing of the operating pressure is only performed within a predefined temperature interval.

14. The method according to claim 4, wherein a temperature of the medium conducting the operating pressure is detected, and switching to the decreased value or the reducing of the operating pressure is only performed within a predefined temperature interval.

15. The method according to claim 5, wherein a temperature of the medium conducting the operating pressure is detected, and switching to the decreased value or the reducing of the operating pressure is only performed within a predefined temperature interval.

16. The method according to claim 6, wherein a temperature of the medium conducting the operating pressure is detected, and switching to the decreased value or the reducing of the operating pressure is only performed within a predefined temperature interval.

17. The method according to claim 1, wherein the transmission is in a motor vehicle, and wherein a differentiation is made between a traction operation and a braking operation of the motor vehicle, and the switching to the decreased value or the reducing of the operating pressure is suspended in the braking operation.

18. The method according to claim 17, wherein the operating pressure is generated by a pump driven by the shift transmission and, in the braking operation, the pump is coupled to the transmission output shaft or a shaft driven thereby.

19. The method according to claim 1, wherein the speed difference between the transmission input shaft and the transmission output shaft and/or between the input side and output side of at least one of the clutches, brakes, the hydrodynamic clutch, and/or the hydrodynamic converter is performed after the switching of the operating pressure to the decreased value or the reducing of the operating pressure and the operating pressure is increased again as a function of the comparing.

20. The method according to claim 1, wherein the switching of the operating pressure to the decreased value or the reducing of the operating pressure is performed as a function of whether the hydrodynamic clutch and/or the hydrodynamic converter and/or another consumer, to which the medium conducting the operating pressure can be applied, is turned on or off.

* * * * *